United States Patent [19]

Imai et al.

[11] Patent Number: 4,995,711

[45] Date of Patent: Feb. 26, 1991

[54] SLIDE TABLE

[75] Inventors: Kuninori Imai, Kanagawa; Takeji Shiokawa, Fuchu; Shigeo Kato, Mitaka; Isao Ishikawa, Takasaki; Toshimichi Ikeda, Ushiku; Kan Otake, Tsuchiura, all of Japan

[73] Assignees: Hitachi, Ltd.; Hitachi Construction Machinery Co., Ltd., both of Tokyo, Japan

[21] Appl. No.: 450,548

[22] Filed: Dec. 14, 1989

[30] Foreign Application Priority Data

Dec. 16, 1988 [JP] Japan .................. 63-316415

[51] Int. Cl.⁵ .................. G02B 21/26; G02B 21/00
[52] U.S. Cl. .................. 350/529; 350/520
[58] Field of Search ............... 350/529, 530, 531, 520; 356/237

[56] References Cited

FOREIGN PATENT DOCUMENTS

| 34745 | 2/1987 | Japan . |
| 97256 | 5/1985 | Japan . |
| 97257 | 5/1985 | Japan . |
| 209838 | 9/1986 | Japan . |
| 2122376 | 1/1984 | United Kingdom . |

OTHER PUBLICATIONS

In re Dailey et al., 149 U.S.P.Q., pp. 47-55.

Primary Examiner—Bruce Y. Arnold
Assistant Examiner—James Phan
Attorney, Agent, or Firm—Antonelli, Terry, Stout & Kraus

[57] ABSTRACT

A slide table includes an inner member, an outer member fitted at least partly over the inner member, air bearings provided between the inner and outer members, and a motor means having a coil connected to the outer member to drive the same.

12 Claims, 7 Drawing Sheets

FIG. IA
PRIOR ART
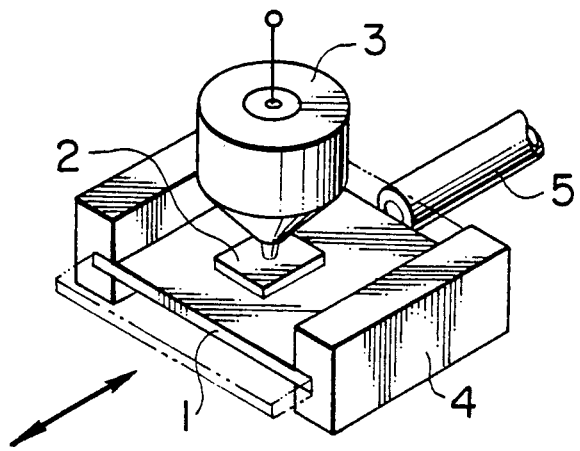
FIG. IB
PRIOR ART
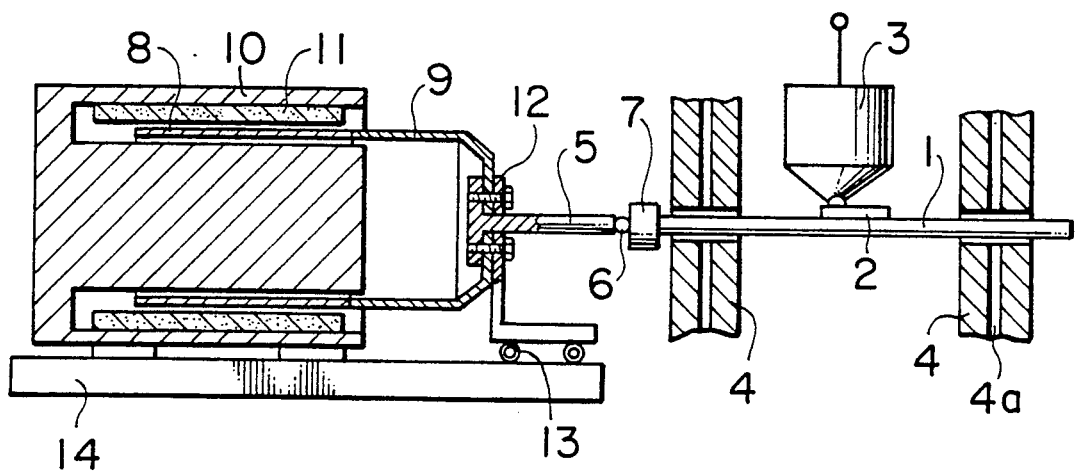

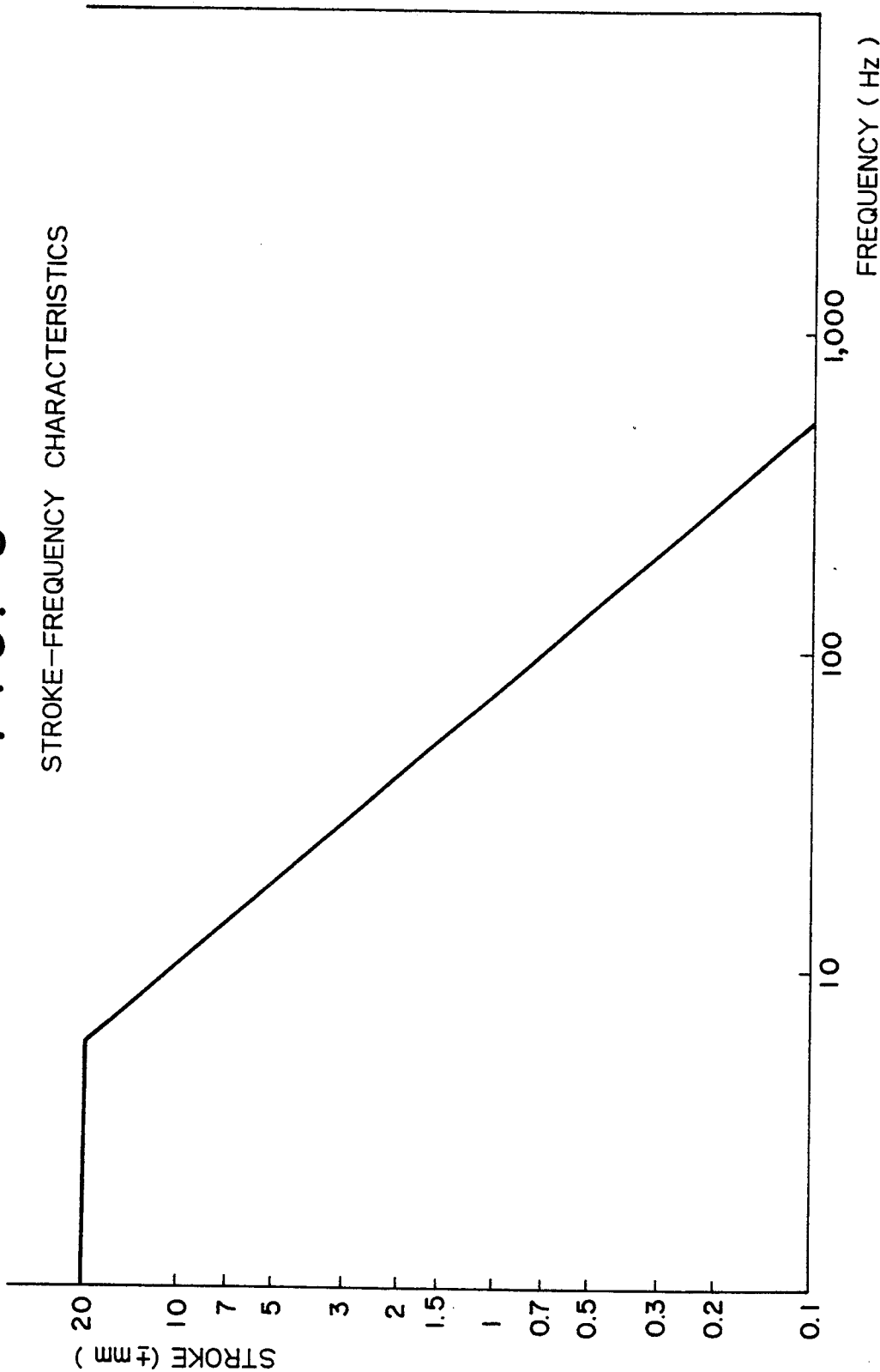

SLIDE TABLE

BACKGROUND OF THE INVENTION

1. Field of the Invention

The present invention relates to a slide table in which a voice coil motor is employed and, more particularly, to a slide table which is suitably incorporated into an ultrasonic microscope for high speed scanning of a probe, sample, or the like.

2. Statement of the Related Art

Conventionally, an apparatus such as an ultrasonic microscope which requires the scanning of a sample with high precision incorporates therein a precision slide table with air bearings, such as disclosed on page 750 of "Precision Machine" 51-4 (1985). In this slide table, a sample (or acoustic lens) is placed on a same base supported by the air bearings, a voice coil motor drives the slide table to move it reciprocatingly, and this reciprocating movement is transmitted to the sample table. In the above structure of the slide table, a bobbin having a coil of the voice coil motor wound therearound is secured to a carriage by which a drive shaft is supported. The carriage is reciprocatingly moved while it is being guided on and along its supporting plate by ball bearings. The axial movement caused by the voice coil motor is transmitted to the sample table via a steel ball provided at a tip end of the drive shaft and via a magnet piece attached to an end of the sample table. However, this structure has a drawback in that when the voice coil motor moves with high speed, the magnet piece is separated from the steel ball due to the inertia of the sample table. This imposes a limitation upon the driving velocity as well as upon the stroke (driving velocity: 10 Hz, stroke: 5 mm or so). In addition, the carriage is attached onto the bobbin of the voice coil motor with the result that the weight being driven by the voice coil motor increases. In consequence, in the case of an apparatus requiring a high responsiveness, it is necessary to employ a voice coil motor whose output has an increased level in accordance with the increased inertia of the apparatus.

The increase in speed and stroke of the slide table has in recent years been demanded. This has required improvement of the slide table. To satisfy this requirement, it is important to make the slide table light in weight. The above-mentioned prior construction, however, is complicated in structure and therefore is difficult to miniaturize. Besides, since the sample table is in the form of a plate, i.e., small in thickness, difficulty is encountered in making the transversal stiffness of the air bearings large and there also exists a drawback that the manufacturing cost is high. Further, in case an acoustic lens is mounted on the sample table, a sample which is located beneath the sample table is difficult to observe because of being hindered by the sample table. This raises problem concerning the operating efficiency.

SUMMARY OF THE INVENTION

An object of the present invention is to provide a novel slide table which eliminates the above-described drawbacks of the prior art, thereby having not only a simple structure, high speed, improved productivity and increased stroke but also high stiffness or rigidity of air bearings.

To attain the above object, the present invention provides a slide table which comprises an inner member, an outer member fitted, at at least a part thereof, over the inner member, air bearings provided between the inner and outer members, and a motor means having a movable section connected to the outer member to drive the same.

Further, the present invention provides an ultrasonic microscope incorporating therein a slide table comprising an inner member, an outer member fitted, at least a part thereof, over the inner member, air bearings provided between the inner and outer members, and a motor means having a movable section connected to the outer member to drive the same.

BRIEF DESCRIPTION OF THE DRAWINGS

FIGS. 1A and 1B are a perspective view and a partly sectional view, respectively, showing a slide table according to the prior art;

FIG. 8 graphically shows an amplitude/frequency characteristic of a slide table according to the invention;

DESCRIPTION OF THE PREFERRED EMBODIMENTS

Figure 2A:
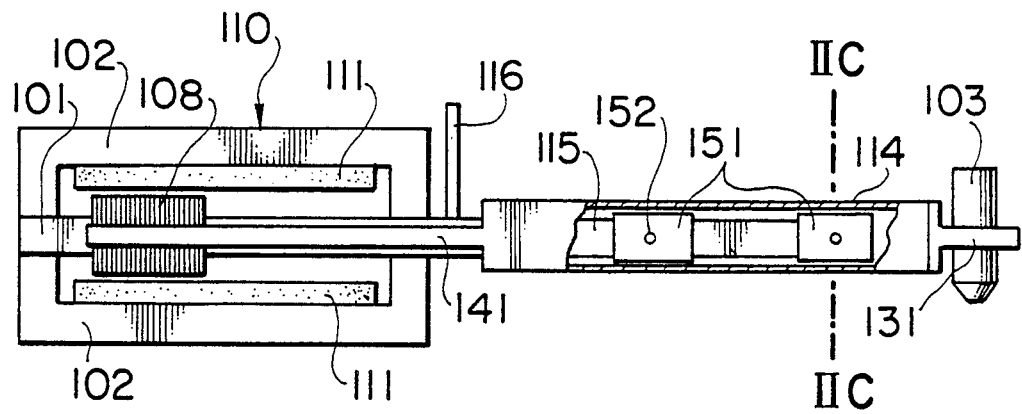
FIGS. 2A, 2B and 2C are a side view, partly broken away, a perspective view, partly broken away, and a partly cross-sectional view, respectively, of a slide table according to a first embodiment of the present invention.

In FIGS. 1A and 1B, a conventional slide table is shown including a voice coil motor, a carriage 12, a plate-like sample table 1 and air bearings 4. The voice coil motor has a coil 8, a bobbin 9, yokes 10 and magnets 11. The bobbin 9 is fixed to the carriage 12 which mounts thereto a drive shaft 5 and which is guided on and along a support plate 14 by means of ball bearings 13. A steel ball 6 is mounted on a tip end of the drive shaft 5. The sample table 1 has a magnet piece 7 mounted on its one end, and is supported by the air bearings 4. Each air bearing 4 has an air blowout hole 4a. The sample table 1 is adapted to have a sample 2 (or acoustic lens 3) placed thereon.

In operation, the drive shaft 5 fluctuates by 2 to 3 μm in the upward and downward direction because a ball bearing in general has a poor sphericity of 2 to 3 μm even in case it is of a precision type. The range within which the sample table 1 of an ultrasonic microscope fluctuates in the upward and downward direction is required to be not more than 0.05 μm in terms of moving precision. To meet this requirement, the method in which the reciprocating movement of the voice coil motor is transmitted to the sample table 1 via the steel ball 6 provided at the tip end of the drive shaft 5 and via the magnet piece 7 mounted on the end of the sample table 1 is adopted so as to prevent the upward/downward fluctuation of the ball bearings 13 from being transmitted to the sample table 1.

In this construction, when the voice coil motor is moved at high speed, the magnet piece 7 frequently is separated from the steel ball 6 due to the inertia of the sample table 1. For this reason, the driving velocity and stroke of the voice coil motor are limited (driving velocity: 10 Hz, stroke: 5 mm or so). In addition, since the carriage 12 is mounted on the bobbin 9, the weight which is to be driven by the voice coil motor increases with the result that an apparatus required to have a high speed response necessitates the use of a voice coil motor whose output is at a level increased in accordance with the increased inertia of the apparatus.

Figure 2B:
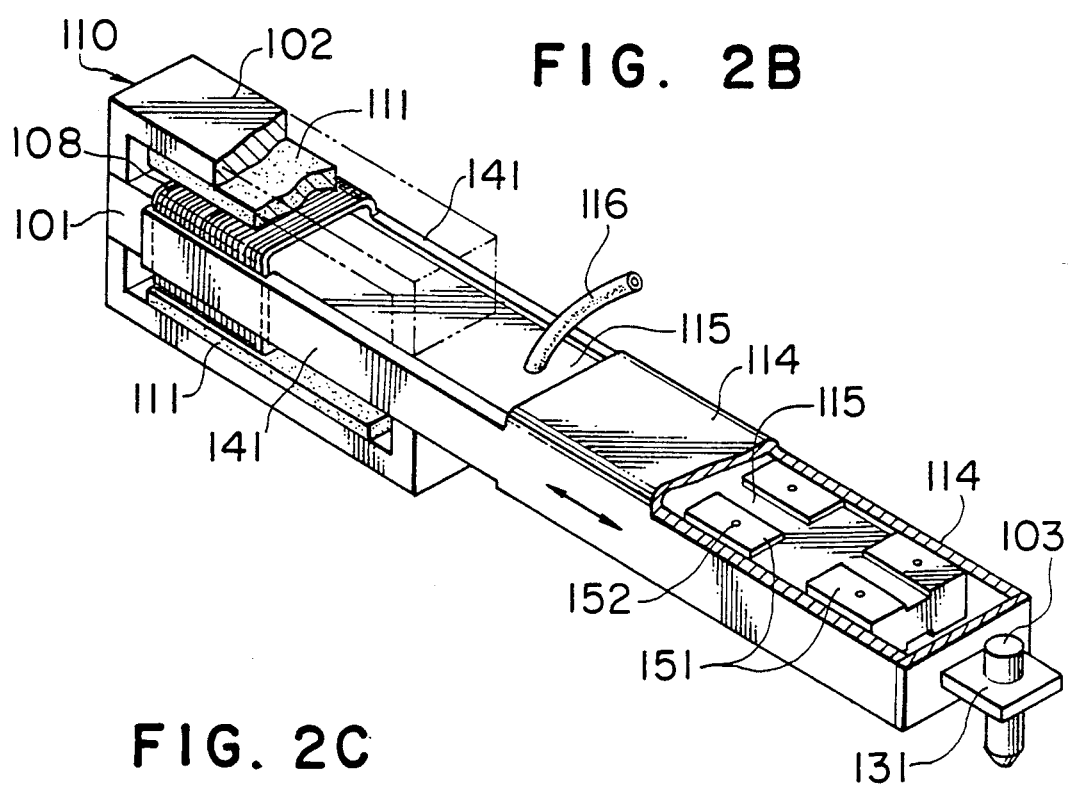
Figure 2C:
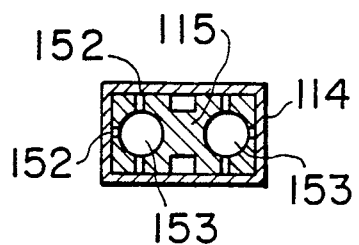

FIGS. 2A, 2B and 2C show a slide table according to a first embodiment of the present invention. This slide table includes a voice coil motor 110, inner member 115, outer member or sheath-shaped member 114, and air bearings 151 provided between the inner member 115 and the outer member 114.

The voice coil motor 110 includes a center yoke 101, two side yokes 102, coil 108 and two magnets 111. The coil 108 is so formed that spacings of approximately 0.5 mm are provided between its inner surface and the center yoke 101 and between its outer surface and the magnets 111. The relative positional relationship between the coil 108 and the center yoke 101 and between the coil 108 and the magnets 111 is determined by the air bearings 151.

The inner member 115 generally has a rectangular-shaped cross section and is provided as an extension integrally extended from the center yoke 101. The inner member 115 is formed with air holes 153 for supplying a compressed air to the air bearings 151 as well as with air blowout holes 152, as later described (see FIG. 2C). The inner member 115 mounts thereto an air supply tube 116. The air blowout holes 152 are provided as a set of six holes in one section of the inner member 115, as shown in FIG. 2C (two holes in each long side of the rectangle and one hole in each short side; six holes in all). That is, twelve holes are provided in two sections of the inner member 115.

The outer member or sheath member 114 is made small in weight by the combination of aluminum plates and is milled and then lapped so that the dimension is such that the spacing between it and the air bearings 151 is in the range of from 10 to 15 μm as measured at one side (in the range of 20 to 30 μm in terms of the dimensional difference between the outer member 114 and the inner member 115). As shown in FIG. 2B, two leg pieces 141 are formed integrally with the sheath-shaped member 114 and are fixed to the coil 108 by an adhesive. A holder 131 for an acoustic lens 103 is adhered to a tip end of the sheath-shaped member 114.

As shown in FIG. 2B, each air bearing 151 stands up by a distance of, for example, 0.2 mm or more from the outer surface of the inner member 115 including upper, lower and side surfaces thereof (the more distant, the more preferable). This makes it possible to clearly distinguish the pressure application region between the air bearings 151 and the sheath-shaped member 114 from the other region and, in addition, to cause an increase in stiffness of the air bearings and, in addition, to facilitate the discharge, outside, of the air from the air bearings 151. The compressed air from a compressed air source (not shown) is passed through the air supply tube 116 and the air holes 153 and then is blown out from the air blowout holes 152, so that the sheath-shaped member 114 can be axially moved together with the coil 108 without contacting the inner member 115.

The material of the inner member 115 is not necessarily required to be the same as that of the center yoke 101 but may be a non-magnetic material. As the material of the inner member 115, it is in some cases more desirable to use a non-magnetic material free from the effect of magnetization because the center yoke 101 is used while it is being magnetized. In addition, where the center yoke 101 is longer than the side yokes 102 and/or the magnets 111, the voice coil motor has a drawback in that it is difficult to manufacture. Where the inner member 115 is formed of a non-magnetic material, it is necessary for the inner member 115 to be separate from the center yoke 101. In this case, the inner member 115 is attached to the center yoke 101 by an adhesive or other suitable means. The dimension of the inner member 115, however, is not required to be the same as that of the center yoke. For example, by making the sectional dimension of the inner member 115 smaller than that of the center yoke 101, it is possible to design the outer member 114 such that the same is lighter in weight as described later.

Figure 3A:
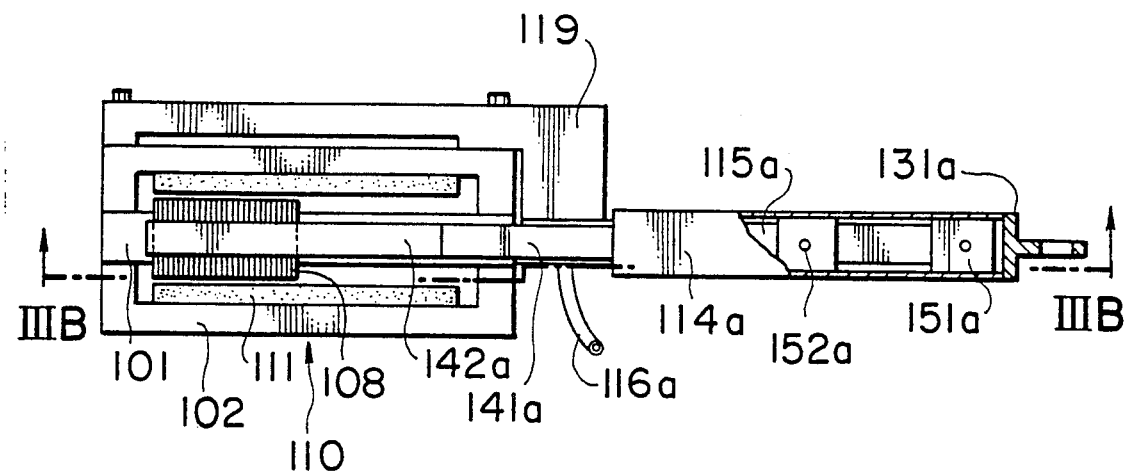
FIGS. 3A and 3B are a side view, a partly broken away, and a plan view, partly broken away, respectively, of a slide table according to a second embodiment of the present invention.
Figure 3B:
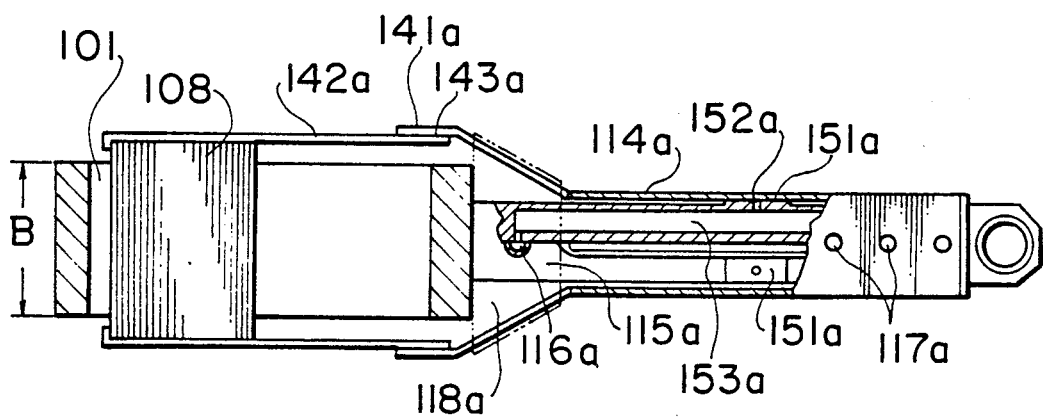

FIGS. 3A and 3B show a slide table according to a second embodiment of the present invention, which has been improved in said respect. The slide table of this second embodiment differs from that of the first embodiment in that the inner member 115a is formed separate from the center yoke 101 and is fixed to a support member 119 by screws together with the voice coil motor 110 and that the outer member or sheath-shaped member 114a is differently constructed. In the second embodiment as well, as already stated, the relative positioning between the coil 108, center yoke 101 and magnets 111 is effected, by screwing the inner member 115a and the motor 110 to the support member 119, in such a manner as to provide a spacing of approximately 0.5 mm between the coil 108, magnets 111 and center yoke 101. In the second embodiment, the inner member 115a is formed of stainless steel (SUS 304) while the sheath-shaped member 114a is formed of a commercially available aluminum extruded tube. The aluminum extruded tube has a uniform sectional dimension in the axial direction and has a good surface roughness of the inner surface for constructing the air bearings. Since such sheath-shaped member 114a formed of aluminum extruded tube is of an integral structure, this provides an advantage in that the sheath-shaped member is lighter in weight and higher in bending rigidity than in the case of the first embodiment wherein the sheath shaped member is formed of a combination of the aluminum plates. Commercially available aluminum extruded tubes, however, are limited to ones of specified dimensions and in addition the precision of a nominal dimension thereof is not satisfactory. For example, where the inner nominal dimension of the aluminum extruded tubes is 15 mm, the actual dimension thereof is 15+0.2 mm. Therefore, it is necessary to make smaller by 20 to 30 μm the dimension of the air bearings than the inner dimension of the aluminum extruded tube, by actually measuring the dimension of the aluminum extruded tubes involved.

In the second embodiment of FIG. 3A, the aluminum extruded tube of 25 (width) × 15 (side length) × 1.5 mm (thickness) was selectively used. Thereafter, the inner dimension thereof was measured. Thereafter, the finished dimension of the inner member 115a was so determined as to permit the spacing between the sheath shaped member 114a and the air bearings 151a to become 10 to 15 μm. The two leg members 141a of the sheath-shaped member 114a desirably are integral with the latter 114a because the bending rigidity can be increased and the weight can be made small. Therefore, the two leg members 141a are formed integrally by cutting and bending, as shown in FIG. 3B. These leg members 141a were bonded, as at 143a, to an aluminum plate 142a adhered to the coil 108. Depending upon the output level of the voice coil motor, the width B of the center yoke 101 in many cases becomes greater than that (25 mm) of the aluminum extruded tube. In such cases, it is necessary to bend the leg members 141a as shown in FIG. 3B. In case the leg members 141a are bent in such a way, there is a fear that the bending rigidity becomes low such that an elastic action occurs in the axial direction. To cope with this problem, if reinforcement plates 118a are bonded to the side surfaces of the leg members 141a as shown by a two-dot chain line in FIG. 3B, the rigidity would further be increased. The sheath-shaped member 114a is formed with air passage holes 117a, which, when the member 114a is moved at high speed, act to prevent the high speed movability thereof from being lost by the air resistance which would otherwise be produced inside the member 114a. In addition, a hole communicated with the interior of the sheath-shaped member 114a may be formed in an acoustic lens holder 131a so as to enhance said high speed movability.

Figure 4A:
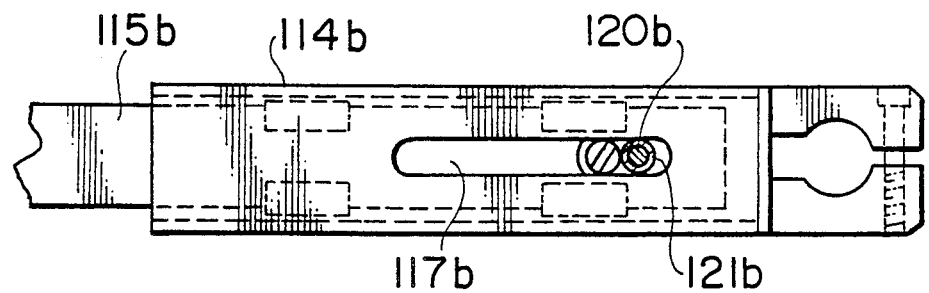
FIGS. 4A, 4B and 4C are a plan view, broken away, a side view, partly broken away, and a partly sectional view, respectively, of a slide table according to a third embodiment of the present invention.
Figure 4B:
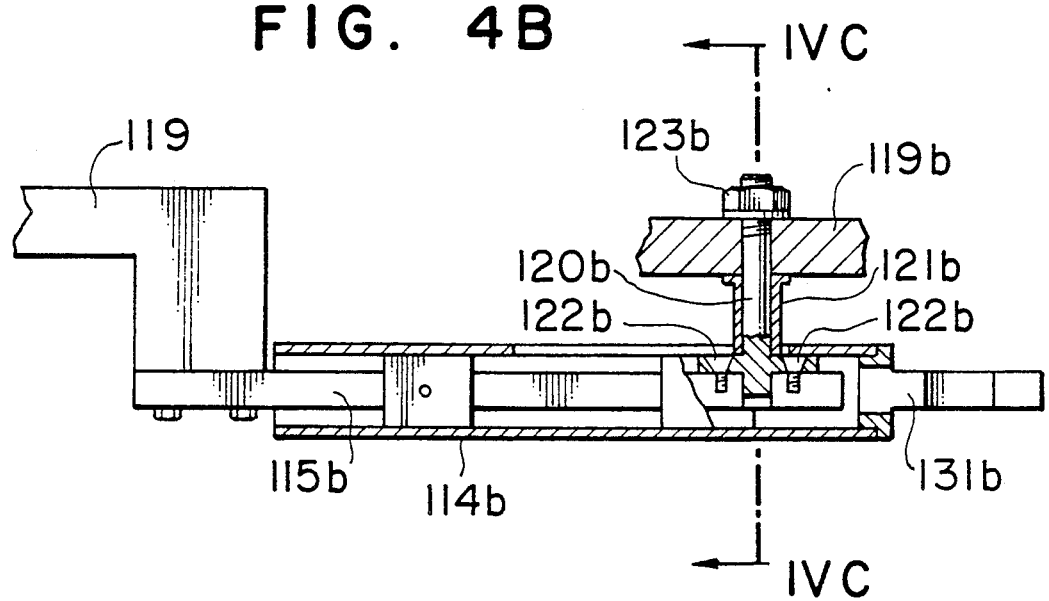
Figure 4C:
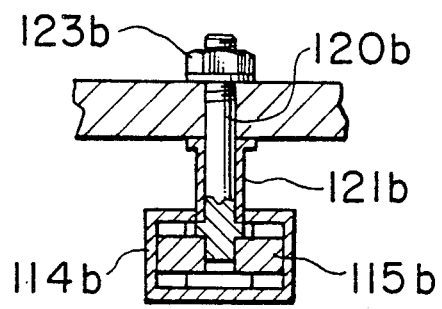

FIGS. 4A, 4B and 4C show a slide table according to a third embodiment of the present invention. This slide table differs from that of the first embodiment in that the inner member 115b is supported at its both ends. In the third embodiment, the sheath-shaped member 114b is formed at its upper surface with a slot 117b. A flanged bolt 120b has a flange at its one end, the flange being fixed to the inner member 115b by means of small screws 122b, while the bolt 120b has its other end fixed to a second support member, 119b by means of a nut 123b. A collar 121b is mounted between the flange of the bolt 120b and the second support member 119b to position the sheath-shaped member 114b. Since the inner member 115b of the third embodiment is supported at its both ends, the slide table as a whole becomes high in bending rigidity to lessen the possibility that the tip end of the sheath-shaped member fluctuates in the vertical direction as compared with the first and second embodiments.

Figure 5A:
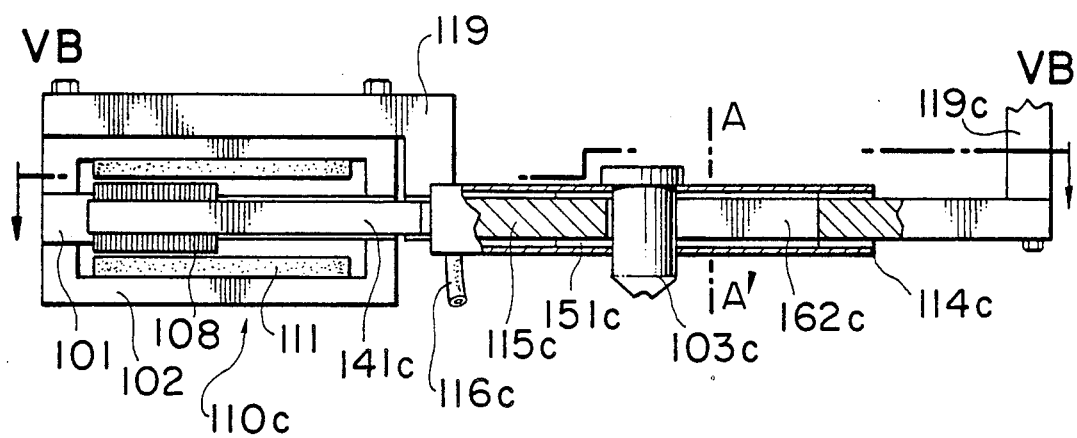
FIGS. 5A and 5B are a side view, partly broken away, and a plan view, partly broken away, respectively, of a slide table according to a fourth embodiment of the present invention.
Figure 5B:
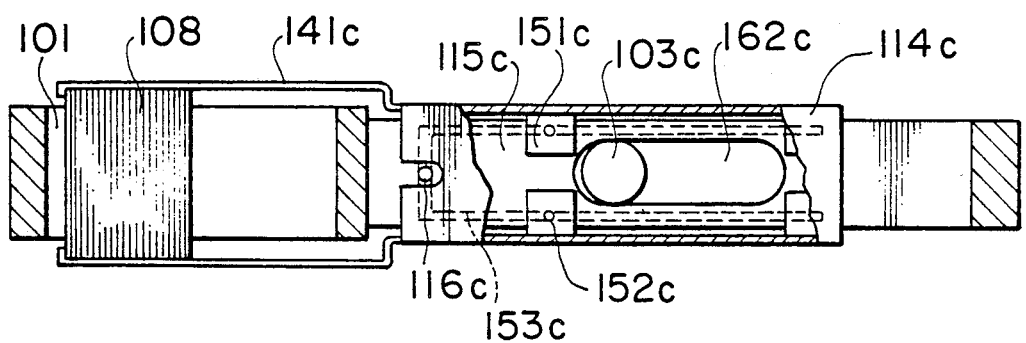

FIGS. 5A and 5B show a slide table according to a fourth embodiment of the present invention. This slide table differs from that of the first embodiment not only in that the acoustic lens 103c is mounted directly on the sheath-shaped member 114c and the tip end portion of the inner member 115c is fixed to the second support member 119c, but also in the manner in which the inner member 115c and the sheath-shaped member 114c are constructed. That is, since the acoustic lens 103c is mounted substantially at the central portion of the sheath-shaped member 114c, the inner member 115c is formed with a slot 162c which passes the acoustic lens 103c therethrough. Further, the air bearings 151c are disposed in such a manner as to interpose therebetween the acoustic lens 103c while the air supply holes 153c are disposed in such a manner as to interpose therebetween said slot 162c. The inner member 115c is fixed to the first and second support members 119, 119c as in the third embodiment. In the fourth embodiment, the upward/downward fluctuation of the acoustic lens is better suppressed as compared with those which occur in the preceding embodiments. Further, as a modification, it is also possible to provide a structure wherein the left side portion from the line A-A' of FIG. 5A is symmetrically transferred to the right side portion from that line (two voice coil motors are employed).

Figure 6:
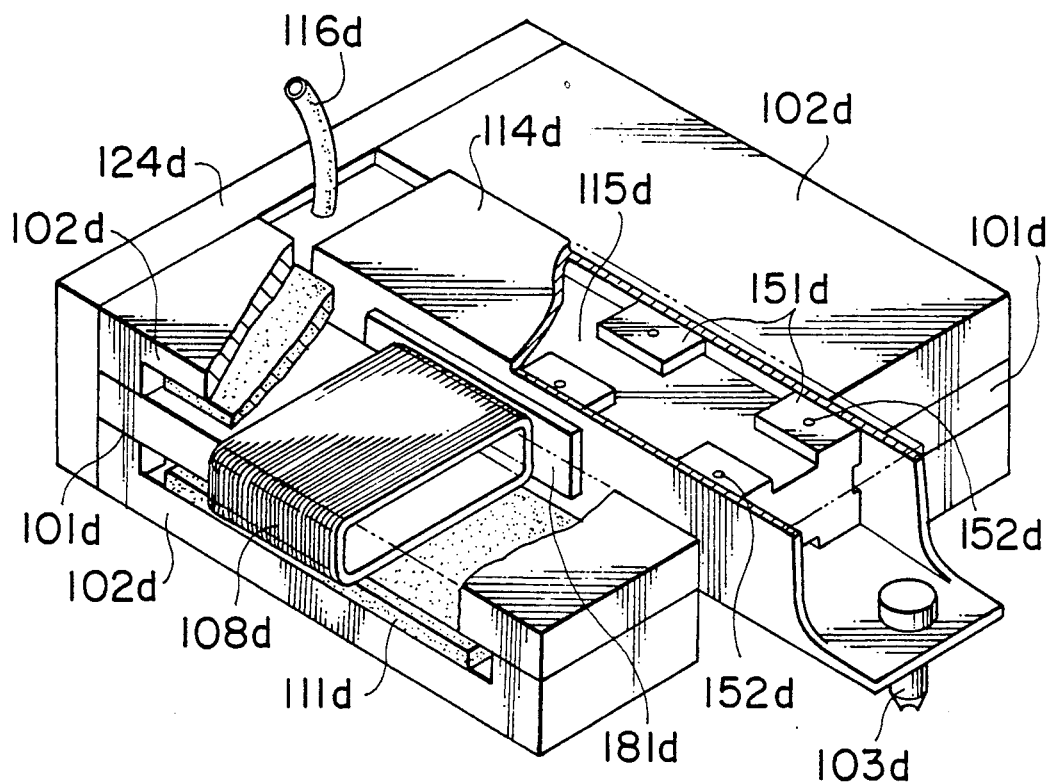
FIG. 6 is a perspective view of a slide table according to a fifth embodiment of the present invention.

FIG. 6 shows a slide table according to a fifth embodiment of the present invention. This slide table differs from that of the first embodiment in that two voice coil motors having a low level of output are employed. As shown in FIG. 6, connecting plates 181d are attached to the voice coil motors 108d, respectively, from the standpoint of operability. On the other hand, each connecting plate 181d is bonded to each side surface of the sheath-shaped member 114d. The structure of the inner member 115d is substantially the same as that in the first embodiment. The center yoke 101d and side yokes 102d of each voice coil motor and the inner member 115d are fixed to a fixing base 124d so as to relatively position the coils 108d, magnets 111d and center yokes 101d. In this construction, the compressed air is supplied to the air supply tube 116d and then is blown out from the air blowout holes 152d to float the sheath-shaped member 114d. The sheath-shaped member 114d receives a drive force from the coil 108d of each voice coil motor.

In the fifth embodiment, the inner member 115d is smaller in length than those in the preceding embodiments, so that the degree of reduction in stiffness resulting from the supporting of the inner member in a manner of a cantilever is reduced. On the other hand, in case the characteristics of the right and left voice coil motors are not identical, the axial drive force given to the sheath-shaped member 114d becomes unstable, so that there is a fear that the sheath-shaped member 114d fluctuates right-and-left. In this respect, the modification of the fourth embodiment wherein two voice coil motors are arranged in series is more advantageous. In the fifth embodiment, however, the slide table as a whole can be made compact in size. Therefore, the fifth embodiment is more advantageous for miniaturization of the apparatus.

Figure 7:
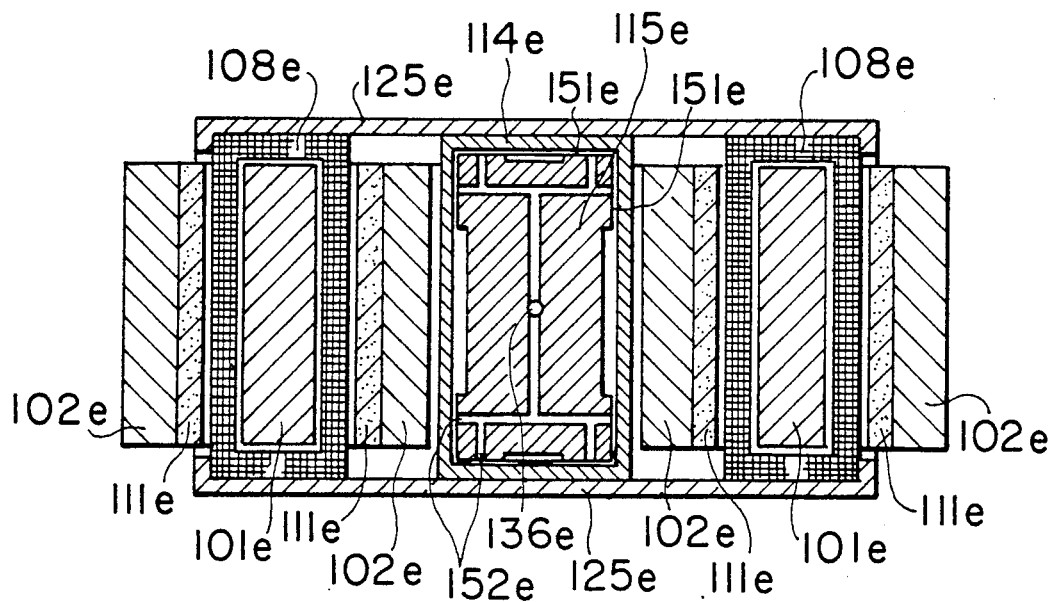
FIG. 7 is a sectional view of a slide table according to a fifth embodiment of the present invention.

FIG. 7 shows a slide table according to a sixth embodiment of the present invention. This slide table differs from that of the fifth embodiment in the manner of connecting the sheath-shaped member 114e to coils 108e of the voice coil motors. In the fifth embodiment, only one side of each coil 108d is attached to the sheath-shaped member 114d. Therefore, in case the voice coil motor drives at high speed, it may impart a bending moment to the sheath-shaped member to deform the same elastically when the inertia of the coils turns. In contrast, in the sixth embodiment, connecting plates 125e bonded to the top and bottom surfaces of the sheath-shaped member 114e are bonded to respective top surfaces and respective bottom surfaces of the coils 108e of the two voice coil motors. Accordingly, the occurrence of such a bending moment as in the fifth embodiment is prevented. This makes it possible to obtain a stable and smooth movability of the slide table.

FIG. 8 is a graph showing theoretical values of the amplitude/frequency characteristics of the slide table according to the present invention. It has been experimentally confirmed that the actually measured values and theoretical values are in coincidence up to a frequency of 100 Hz.

In the above-described embodiments, the acoustic lens is placed on the sheath-shaped member. Alternatively, the same advantage can be obtained even when a sample is placed on the sheath-shaped member instead of the acoustic lens.

As has been described above, the slide table according to the present invention is so arranged as to drive the sheath-shaped member having the acoustic lens mounted thereon. Namely, the slide table according to the present invention can be so designed as to become light in weight, so that the slide table has an improved high speed movability. In addition, the structure thereof is compact-sized and simplified and is also easy to manufacture. If, therefore, the present invention is applied to an ultrasonic microscope, design of a compact-sized apparatus having improved high speed movability becomes possible. For instance, in the first and second embodiments, the movable section including the acoustic lens as well can be so designed as to have a weight of approximately 100 g. In addition, the movable section has a stroke of ±1.7 mm and a high speed movability of 50 Hz by employing a voice coil motor whose output is 10 N. Further, in the fifth and sixth embodiments, the movable section can be so designed that its weight may be 150 to 200 g, and can have the same or better high speed movability as or than that attainable with the first and second embodiments by employing two voice coil motors whose outputs are each 10 N. The stability of the movement is good in any one of the above-described embodiments. The embodiments wherein two voice coil motors are employed are somewhat more excellent than the remaining embodiments in that the sideward fluctuation is less made in the former embodiments. Further, when the driving velocity is 1 Hz, the movable section can have a long stroke of 40 mm (±20 mm). Performance of such high speed movement and long stroke in a single slide table was never possible with the conventional slide table. The advantages of the present invention are thus obvious.

In each of the above-described embodiments, the inner member and the sheath-shaped member have a rectangular cross section, but may have a given cross-sectional configuration such as a polygonal or circular one. In the case of a polygonal section, however, the manufacture is more difficult than in the case of a rectangular section. In the case of a circular section, a rotation stopper is required to be provided.

The present invention has been described by way of the embodiments but is not limited thereto. The invention is restricted only by the scope of the invention.

What is claimed is:

1. A slide table comprising an inner member a sheath shaped outer member at least partly engaged with said inner member, air bearings provided between at least a part of said inner member and said sheath shaped outer member for enabling said sheath shaped outer member to be movable relative to said inner member, and motor means for moving said sheath shaped outer member relative to said inner member.

2. A slide table according to claim 1, wherein said air bearings space said inner member from said sheath shaped outer member such that opposed surfaces on one side of said inner member and said outer sheath shaped member are separated by a gap of 5 to 20 μm.

3. A slide table according to claim 2, wherein said inner member and said outer sheath shaped member have a polygonal cross-sectional configuration.

4. A slide table according to claim 3, wherein said polygonal cross-sectional configuration is quadrilateral.

5. A slide table according to one of claims 2, 3 or 4, wherein said outer sheath shaped member is formed of aluminum extruded tube material.

6. A slide table according to claim 1, wherein said motor means includes at least one coil motor.

7. A slide table according to claim 6, wherein a coil of said at least one voice coil motor is connected to said outer sheath shaped member.

8. A ultrasonic microscope including a slide table according to claim 1.

9. A slide table according to claim 1, wherein said motor means includes a magnetic field generating coil.

10. A slide table according to claim 1, wherein said sheath shaped outer member includes an upper end and a lower end for enabling a mounting of connecting plates thereto.

11. A slide table according to claim 1, wherein said motor means is a linear motor, and wherein at least a part of said inner member is integral with said linear motor.

12. A slide table comprising an inner member, an outer sheath shaped member fitted at least partly over said inner member, air bearings provided between said inner and outer members, and motor means having a movable section connected to said outer member to drive the same, wherein said inner member and said outer sheath shaped member have substantially identical cross-sectional configurations, and wherein said outer sheath shaped member is formed of aluminum extruded tube material.

* * * * *